(12) United States Patent
Janssens et al.

(10) Patent No.: US 11,262,225 B2
(45) Date of Patent: Mar. 1, 2022

(54) FLOW SENSOR, METHOD AND FLOWMETER FOR DETERMINING SPEEDS OF PHASES OF A MULTI-PHASE MEDIUM

(71) Applicant: KROHNE AG, Basel (CH)

(72) Inventors: Yves Louis Janssens, The Hague (NL); Cornelis Johannes Hogendoorn, Spijk (NL)

(73) Assignee: KROHNE AG, Basel (CH)

( * ) Notice: Subject to any disclaimer, the term of this patent is extended or adjusted under 35 U.S.C. 154(b) by 472 days.

(21) Appl. No.: 16/012,189

(22) Filed: Jun. 19, 2018

(65) Prior Publication Data

US 2018/0364083 A1 Dec. 20, 2018

(30) Foreign Application Priority Data

Jun. 19, 2017 (DE) .......................... 102017113453.0

(51) Int. Cl.
*G01F 1/74* (2006.01)
*G01N 27/22* (2006.01)
(Continued)

(52) U.S. Cl.
CPC .................. *G01F 1/74* (2013.01); *G01F 1/56* (2013.01); *G01F 1/584* (2013.01); *G01N 9/002* (2013.01);
(Continued)

(58) Field of Classification Search
CPC .. G01F 1/74; G01F 1/56; G01F 1/584; G01N 21/31; G01N 9/002; G01N 27/221; G01N 29/022; G01N 2009/008
(Continued)

(56) References Cited

U.S. PATENT DOCUMENTS

2008/0236298 A1* 10/2008 Gysling .................... G01F 1/36
  73/861.42
2010/0148804 A1* 6/2010 Jakoby .................... G01F 1/662
  324/663
(Continued)

FOREIGN PATENT DOCUMENTS

| DE | 102008022215 A1 | 11/2009 |
|----|----|----|
| JP | S63246619 A | 10/1988 |
| JP | H03138534 A | 6/1991 |

OTHER PUBLICATIONS

European Search Report Application No. EP 18 17 7966 Completed: Dec. 12, 2018; dated Dec. 4, 2018 2 pages.
(Continued)

*Primary Examiner* — Douglas X Rodriguez
*Assistant Examiner* — Trung Q Nguyen
(74) *Attorney, Agent, or Firm* — Whitmyer IP Group, LLC

(57) ABSTRACT

A flow sensor for a multi-phase medium flowmeter has a sensor carrier, and the sensor carrier has at least one first sensor array. The at least one first sensor array has a first permittivity sensor for determining a first permittivity of a multi-phase medium, a second permittivity sensor for determining a second permittivity of the medium, a density sensor for determining a density of the medium, and a first sensor axis. The first permittivity sensor, the second permittivity sensor, and the density sensor are arranged on the sensor carrier along the first sensor axis, and the first permittivity sensor and the second permittivity sensor are spaced apart with a permittivity sensor distance.

6 Claims, 5 Drawing Sheets

(51) Int. Cl.
  *G01F 1/56*  (2006.01)
  *G01N 29/02*  (2006.01)
  *G01N 9/00*  (2006.01)
  *G01F 1/58*  (2006.01)

(52) U.S. Cl.
  CPC ......... *G01N 27/221* (2013.01); *G01N 29/022* (2013.01); *G01N 2009/008* (2013.01)

(58) Field of Classification Search
  USPC ....... 324/663–665, 600, 500, 451, 452, 467, 324/71.3, 71.4, 300
  See application file for complete search history.

(56) References Cited

U.S. PATENT DOCUMENTS

| | | | |
|---|---|---|---|
| 2013/0261995 A1 | 10/2013 | Jiang et al. | |
| 2015/0362350 A1* | 12/2015 | Miller | G01F 23/0046 73/290 V |
| 2018/0348035 A1* | 12/2018 | Huang | G01F 1/74 |

OTHER PUBLICATIONS

R. Pohle: "Potentials of Capacitive Micromachined Ultrasonic Transducers (CMUT) and Film Bulk Acoustic Wave Resonators (FBAR) for Gas Sensing—an Industrial Point of View", ISBN 978-3-9813484-2-2 pp. 469-472.

* cited by examiner

FLOW SENSOR, METHOD AND FLOWMETER FOR DETERMINING SPEEDS OF PHASES OF A MULTI-PHASE MEDIUM

TECHNICAL FIELD

The invention relates primarily to a flow sensor for a flowmeter. Thereby, the flow sensor has a sensor carrier and the sensor carrier has at least a first sensor array. Further, the invention relates to a method for determining speeds of phases of a multi-phase medium using a flow sensor. Furthermore, the invention also relates to a flowmeter having a sensor control, a measuring tube and at least one flow sensor. Thereby, the flowmeter is designed for determining speeds of phases of a multi-phase medium in a measuring tube.

BACKGROUND

In general, a flowmeter determines a flow of a medium through a measuring tube. The flow can be a mass flow or a volume flow of the medium. In principle, the flow is determined using a speed of the medium with which the medium flows through the measuring tube. Often, the medium is not only one but several phases and is then referred to as a multi-phase medium. In order to determine the flow of a phase of a multi-phase medium through the measuring tube, a speed of the phase with which the phase flows through the measuring tube must be determined accordingly. For determining the speeds of phases of a multi-phase medium, a flowmeter has at least one flow sensor. A sensor control of a flowmeter is designed to carry out a method for determining speeds of phases of the multi-phase medium with a flow sensor during operation of the flowmeter, i.e. when a multi-phase medium flows through the measuring tube. Usually, the sensor control is further designed to determine the flow of the phases of the multi-phase medium through the measuring tube from the determined speeds.

Various measuring principles are known from the prior art for determining a speed of a medium with which the medium flows through a measuring tube. The different measuring principles are implemented by different flowmeters with different flow sensors and different methods.

For example, flowmeters are known that operate according to mechanical measuring principles. Such a measuring principle is implemented, for example, by differential pressure flowmeters. In a differential pressure flowmeter, the at least first flow sensor is designed as a pressure sensor for measuring a differential pressure of a medium flowing through the measuring tube. Using a differential pressure measured by the pressure sensor, a speed of the medium in the measuring tube is determined. Vortex flowmeters also implement mechanical measuring principles. In a vortex flowmeter, the at least first flow sensor is designed, for example, as a pressure sensor or strain gauge or piezoelectric transducer for determining a vortex frequency of a medium flowing through the measuring tube. A speed of the medium in the measuring tube is determined using a vortex frequency measured by the flow sensor.

Furthermore, flowmeters are known which operate according to an acoustic measuring principle. These flowmeters are referred to as ultrasonic flowmeters. In an ultrasonic flow meter, the at least first flow sensor is designed as an ultrasonic sensor. Ultrasonic signals are transmitted into a medium flowing through the measuring tube and received by the ultrasound sensor, and a speed of the medium in the measuring tube is determined using the transmitted and received ultrasound signals.

Flow sensors and flowmeters known from the prior art have various disadvantages. Their manufacture is often complex and correspondingly expensive and/or they operate according to a measuring principle and method which allows only a determination of the speed of a single-phase medium.

Thus, an object of the present invention is to provide a flow sensor for a flowmeter which enables the determination of speeds of phases of a multi-phase medium and which allows for the disadvantages shown to at least be reduced.

SUMMARY

The object is achieved with the flow sensor by the features from patent claim 1. The at least first sensor array of the flow sensor according to the invention has a first permittivity sensor for determining a first permittivity of a multi-phase medium, a second permittivity sensor for determining a second permittivity of the medium, a density sensor for determining a density of the medium and a first sensor axis. Further, the first permittivity sensor, the second permittivity sensor and the density sensor are arranged on the sensor carrier along the first sensor axis and the first permittivity sensor and the second permittivity sensor are spaced apart with a permittivity sensor distance.

The permittivities to be determined, i.e. the first and the second permittivity, are relative permittivities. For their determination, the first and the second permittivity sensor each have a sensitive area. To determine the density, the density sensor also has a sensitive area. During operation of the flow sensor, at least the sensitive areas of the sensors are in direct or indirect contact with the multi-phase medium and respond directly to the respective measured variable, i.e. permittivity or density.

A sensor carrier is a device on which at least one sensor is arranged. The arrangement is a mechanically fixed connection between the sensor and the sensor carrier so that the sensor is fixed on the sensor carrier. A sensor array generally comprises at least two sensors, wherein the sensors of a sensor array, together, measure the physical variables necessary for determining speeds of phases of a multi-phase medium. Thus, a sensor carrier with a sensor array generally has at least two sensors.

The first permittivity sensor, the second permittivity sensor and the density sensor are arranged along the first sensor axis. This means that the sensors are arranged either on the left and right along the sensor axis or preferably on the sensor axis. If at least the first and the second permittivity sensor are arranged on the sensor axis, then the permittivity sensor distance is the distance between the two sensors on the sensor axis.

An advantage of the flow sensor according to the invention, as opposed to flow sensors known from the prior art, is that speeds of phases of a multi-phase medium can be determined. In addition, the essential components of the flow sensor, i.e. the sensor carrier and the sensors, are cost-effective and the production of the flow sensor is associated with less effort compared to the prior art and is accordingly cost-effective.

The invention is based on several findings.

One finding is that a medium, such as a multi-phase medium, has different flow structures during flow, for example, through a measuring tube. Flow structures are, for example, flow vortexes or bubbles from one phase in another phase or the distribution of the individual phases. In the examination of flow structures, it has been recognized that, in each case, two phases of a multi-phase flowing medium are separated from one another at an interface. If a multi-phase medium, for example, has the phases of water, oil and gas, bubbles of oil and gas, for example, flow embedded in the water, the speeds of the phases being different from one another. In this example, for example, there is an interface between a bubble of oil and the water, and another interface between a bubble of gas and the water.

A further finding is that the phases of a multi-phase medium have different permittivities and/or different densities. Thus, the permittivity of water is $\varepsilon_{r,water}=80$, of oil is $\varepsilon_{r,oil}=2.5$ and of gas is $\varepsilon_{r,gas}=1$. The density of water is $\rho_{water}=1000$ kg/m$^3$, of oil is $\rho_{oil}=800$ kg/m$^3$, and of gas $\rho=1$ kg/m$^3$. Thus, the phases from the described example can be distinguished from one another by determining permittivity and density. Thus, an interface is present between regions of different permittivity and/or different density from one another. Therefore, the flow sensor has both the permittivity sensors and the density sensor.

A further finding is that a speed of a phase of the medium, for example of a bubble described above, can be assigned to a speed of an interface, for example the interface of the bubble. Thus, the flow sensor has the first and second permittivity sensors for determining the velocity of an interface.

Examinations of flow structures of multi-phase media have shown that flow structures are usually not less than 0.5 mm. In tests with flow sensors, it has been found that an accuracy of a determination of speeds of phases of a multi-phase medium decreases when the sensitive regions of the sensors of the flow sensor are larger than the flow structures. Thus, in one design of the flow sensor according to the invention, sensitive areas of the sensors are smaller than smallest flow structures of the medium, preferably less than 0.5 mm.

In a further embodiment, it is provided that the density sensor is arranged between the first permittivity sensor and the second permittivity sensor. Since the first and second permittivity sensors must be spaced apart by the permittivity sensor distance, the arrangement of the density sensor between the permittivity sensors causes a more compact sensor array than if the density sensor were arranged only next to one of the permittivity sensors. The more compact sensor array causes small flow structures to produce a smaller drop in the accuracy of the sensor array than if the density sensor were not arranged between the permittivity sensors.

In another design of the flow sensor, the sensor carrier is a circuit board. Preferably, the board consists of FR-4. The task of the sensor carrier is primarily the arrangement of the sensors, i.e. the first and second permittivity sensors and the density sensor. Since the sensors are electrical components, they must also be electrically connected. Thus, it is advantageous when the sensor carrier not only arranges the sensors, but also electrically contacts them so that they are electrically connected. A printed circuit board is able to do both, since printed circuit boards have a carrier on which at least one copper layer is applied on one side, into which traces can be made, for example, by etching. Electrical contact of the sensors is carried out, for example, by traces and vias.

Permittivity sensors such as the first and second permittivity sensors are sensors that determine a permittivity of a medium. The determination of a permittivity of a medium can also be carried out by determining a capacitance of the medium, which is why, in a further embodiment, it is provided that at least the first permittivity sensor is designed as a capacitance sensor. The permittivity can then be determined using a determined capacitance. Preferably, both the first and second permittivity sensors are configured as capacitance sensors.

In a further development of the preceding design, it is provided that the capacitance sensor has a first electrode and a second electrode for determining a capacitance of the medium. Preferably, the electrodes, i.e. the first and second electrodes, are designed as rectangular areas with a width b and a length l. An arrangement of the electrodes is then provided, in which the electrodes are arranged parallel to one another at a distance a. The area A of the sensitive area of such a capacitance sensor is then $A=(b+a+b)\cdot l$. The immersion depth T of the capacitance sensor into the medium is:

$$T = a\sqrt{\left(1+\frac{b}{a}\right)^2 - 1}$$

Accordingly, it is useful to arrange several sensor arrays with the permittivity sensors having different immersion depths on the sensor carrier so that the permittivity of the medium can be determined at different points.

If the sensor carrier is a circuit board and at least the first permittivity sensor is designed as a capacitance sensor with a first and a second electrode, then it is advantageous if at least the first electrode is formed as a trace on the circuit board. The electrode is made, for example, by etching. Thus, the electrodes of the permittivity sensors and contacts of the sensors can be produced together. This design is thus distinguished by an efficient and therefore cost-effective production.

If at least the first electrode is designed as a trace on the circuit board, a further design provides that at least the trace is passivated. Preferably, all of the traces on the circuit board are passivated. Passivation is necessary, since otherwise, the traces would be in direct contact with the medium, which could damage them. Preferably, the passivation is carried out using amorphous carbon, which is referred to as a diamond-like carbon and is abbreviated as DLC.

The density sensor can be designed in different manners. In one design of the flow sensor, the density sensor is designed as a piezo sensor. A piezo sensor has piezo-electric material. This material converts a mechanical deformation into an electrical signal and an electrical signal into a mechanical deformation. Lead zirconate titanate, which is abbreviated by PZT, is a suitable piezo-electric material. For example, a piezo sensor has a diameter of 200 μm and a thickness of 50 μm and, for example, is excited to a mechanical oscillation by a sensor control with an electrical signal and a frequency is measured by the sensor control. Since the measured frequency depends on a density of the medium in the sensitive region of the piezo sensor, the density of the medium at the sensor can be determined from the measured frequency.

In a further development of the above design, it is provided that the piezo sensor is designed as a film bulk acoustic wave resonator. Film bulk acoustic wave resonator is abbreviated as FBAR. Preferably, the FBAR is constructed on a micro-mechanical silicon nitride membrane with a piezo-electric thin film and aluminum electrodes. An FBAR is suitable for both vaporous and fluid media and allows for small dimensions and high sensitivity so that even small changes in a concentration of gases and fluids can be determined.

In another design of the flow sensor, it is provided that the density sensor is a capacitive micro-mechanical ultrasonic transducer. An advantage of a capacitive micro-mechanical ultrasonic transducer compared to a piezo sensor as a density sensor is that it does not have a high permittivity compared to the piezo sensor, which can impair a determination of a permittivity of the medium by the permittivity sensors.

In a further design, it is provided that the sensor carrier has a recess and the density sensor is arranged in the recess. This design is particularly advantageous when the sensor carrier is a circuit board and the permittivity sensors are designed as capacitance sensors with electrodes, wherein the electrodes are traces. In this design, a surface of the sensor carrier is substantially flat, whereby a flow of a medium flowing over the sensor carrier is not influenced.

In a further design, it is provided that at least one of the sensors is designed as a micro-sensor. Micro-sensors are sensors that have structures the sizes of which being in the micrometer range, at least in the sensitive areas.

In a further design, it is provided that the sensor carrier, in addition to the first sensor array with the first sensor axis, also has a second sensor array with a second sensor axis, and that the first sensor axis and the second sensor axis differ from one another. The first sensor axis and the second sensor axis differ from one another in such a manner that the first sensor axis and the second sensor axis spans a plane.

A further object of the invention is to provide a method for determining the speeds of phases of a multi-phase medium with a flow sensor according to the invention.

The object is achieved using a method, in which the flow sensor is immersed into a flowing multi-phase medium. In compliance with the method according to the invention, a first permittivity curve is determined with the first permittivity sensor, a second permittivity curve is determined with the second permittivity sensor and a density curve of the medium is determined with the density sensor. Further, at least one speed of a phase of the medium is determined from the first permittivity curve, the second permittivity curve and the density curve, using a correlation method.

The first permittivity curve of the medium is determined in that the first permittivity of the medium is determined over time by the first permittivity sensor. Correspondingly, the second permittivity curve is determined in that the second permittivity of the medium is determined over time by the second permittivity sensor. Along the same lines, the density curve of the medium is determined, in that the density of the medium is determined over time by the density sensor.

In one design of the method, it is provided that the following process steps are carried out during the correlation method.

In a first method step, a permittivity change is detected in the first permittivity curve, and then the permittivity change is also detected in the second permittivity curve.

In a further method step, a permittivity change interval is determined between the permittivity change in the first permittivity curve and in the second permittivity curve and a speed of the permittivity change is determined using the permittivity change interval and the permittivity sensor distance.

In a further method step, the speed of the permittivity change is assigned to a speed of a phase of the medium using the density curve and/or the first permittivity curve and/or the second permittivity curve.

These method steps are accordingly carried out not only in the presence of one permittivity change, but also in the presence of of several permittivity changes.

Two phases of a multi-phase medium often have different permittivities. An interface of these two phases thus exhibits a change in permittivity, which is measured by both the first permittivity sensor and the second permittivity sensor, as the permittivity changes flow by both sensors. Since the spatial permittivity sensor distance is known and the temporal permittivity change interval is determined, the speed of the change in permittivity, i.e. the interface, can be determined from this information. In the last method step, the speed of the change in permittivity is assigned to a speed of a phase of the medium. The assignment is carried out according to a correlation method.

A further object of the present invention is to provide a flowmeter for determining speeds of phases of a multi-phase medium, in which the mentioned disadvantages are at least reduced.

The object is achieved by the flowmeter. In the flowmeter according to the invention, the at least first flow sensor of the flowmeter is designed according to a flow sensor according to the invention and the sensor control is designed for carrying out a method according to the invention. Further, the at least first flow sensor is arranged at a position on the measuring tube so that when a multi-phase medium flows through the measuring tube, the medium flows around the flow sensor, the flow sensor has a first immersion depth in the medium and the first sensor axis has a component parallel to the direction of flow of the medium. Further, the sensor control is preferably designed for controlling the at least first flow sensor.

The advantages resulting from the use of the flow sensor according to the invention and the method according to the invention are carried over to the flowmeter according to the invention.

In one design of the flowmeter according to the invention, it is provided that the measuring tube is designed so that the at least first flow sensor can be inserted and removed during operation. In this manner, the medium can remain in the measuring tube during an exchange of the flow sensor, whereby the time required for an exchange is reduced.

It is provided in a further design that the sensor control has at least one resonant circuit having a resonance frequency, that the first permittivity sensor is a part of the resonant circuit and that the first permittivity of the medium is determined using the resonance frequency. The resonant circuit is, for example, an RC or LC resonant circuit, wherein the first permittivity sensor contributes to the capacitive component of the resonant circuit. The capacitance of the medium is included in the resonance frequency. In a further development, it is provided that the same is also implemented in conjunction with the second permittivity sensor.

In a further design, it is provided that, in addition to the first flow sensor having the first position and the first immersion depth, the flowmeter has a second flow sensor at a second measuring position, having a second immersion depth and the second measuring position differs from the first measuring position and/or the second immersion depth differs from the first immersion depth. Further, the sensor control is designed for controlling both the first as well as the second flow sensor.

By using two or more flow sensors at different positions on the measuring tube and/or having different immersion depths in the medium, the determination of speeds of phases of the multi-phase medium is carried out at different locations, whereby a higher resolution is achieved.

In detail there is a plurality of possibilities for designing and further developing the flow sensor, the method and the flowmeter. Reference is made to the claims subordinate to the independent claims as well as to the following description of preferred embodiments in conjunction with the drawings.

DETAILED DESCRIPTION

Figure 1:
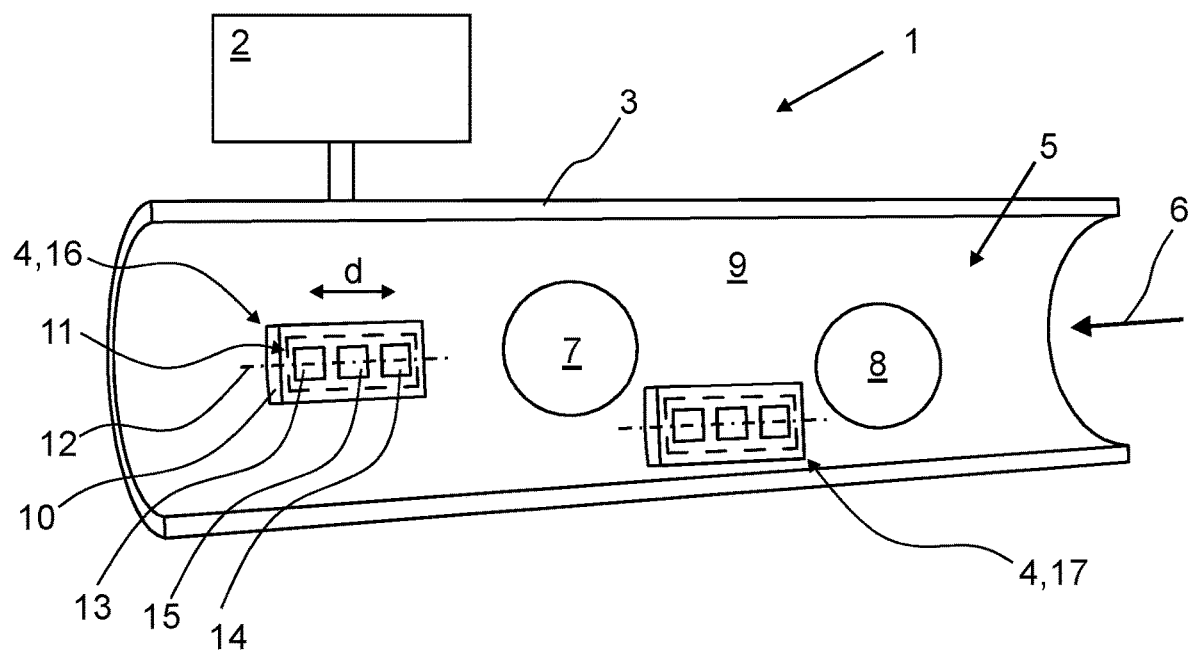
FIG. 1 illustrates a first embodiment of a flowmeter having two flow sensors.

FIG. 1 shows essential features of a first embodiment of a flowmeter 1 in an abstracted perspective sectional view. The flowmeter 1 has a sensor control 2, a measuring tube 3 and two flow sensors 4. Since the flow meter 1 is in operation, a multi-phase medium 5 flows through the measuring tube 3. The multi-phase medium 5 essentially has the phases water, oil and gas. The individual phases have different flow structures, which differ in their flow speeds and flow directions from one another. However, the medium 5 flows in its entirety in a total flow direction 6 through the measuring tube 3. In FIG. 1, an oil bubble 7 and a gas bubble 8 embedded in water 9 represent the flow structures of the medium 5 by way of example.

The flow sensor 4 has a sensor carrier 10 and this has a sensor array 11. The sensor array 11 has a sensor axis 12 and comprises a first permittivity sensor 13 for determining a first permittivity, a second permittivity sensor 14 for determining a second permittivity of the medium 5, and a density sensor 15 for determining a density of the medium 5. The sensors 13, 14 and 15 are arranged on the sensor axis 12 in such a manner that the density sensor 15 lies between the first permittivity sensor 13 and the second permittivity sensor 14.

One of the two flow sensors 4 is arranged at a first measuring position 16 on the measuring tube 3 so that the medium 5 flows around it. It has a first immersion depth into the medium 5 and its sensor axis 12 has a parallel component to a flow direction of the medium 5. The other of the two flow sensors 4 is arranged at a second measuring position 17 on the measuring tube 3 so that the medium 5 also flows around it. It has a second immersion depth into the medium 5 that is different from the first immersion depth and its sensor axis 12 has a parallel component to a flow direction of the medium 5. In this embodiment, the sensor axes 12 have, in particular, a parallel component to the total flow direction 6. In an alternative embodiment of the flowmeter, at least one of the two flow sensors is arranged on the measuring tube 3 rotated by 90° about its sensor axis.

Figure 2A:
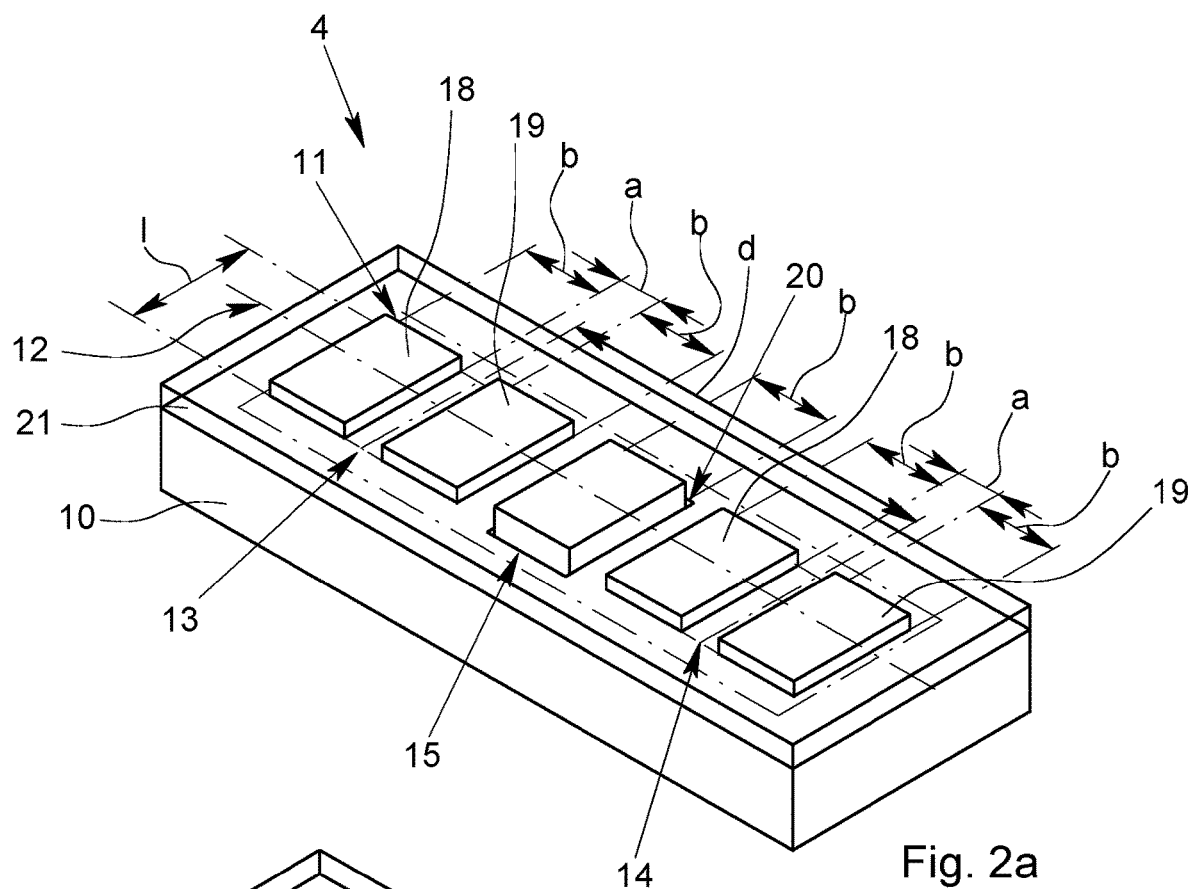
FIG. 2a and FIG. 2b illustrate a first embodiment of a flow sensor.
Figure 2B:
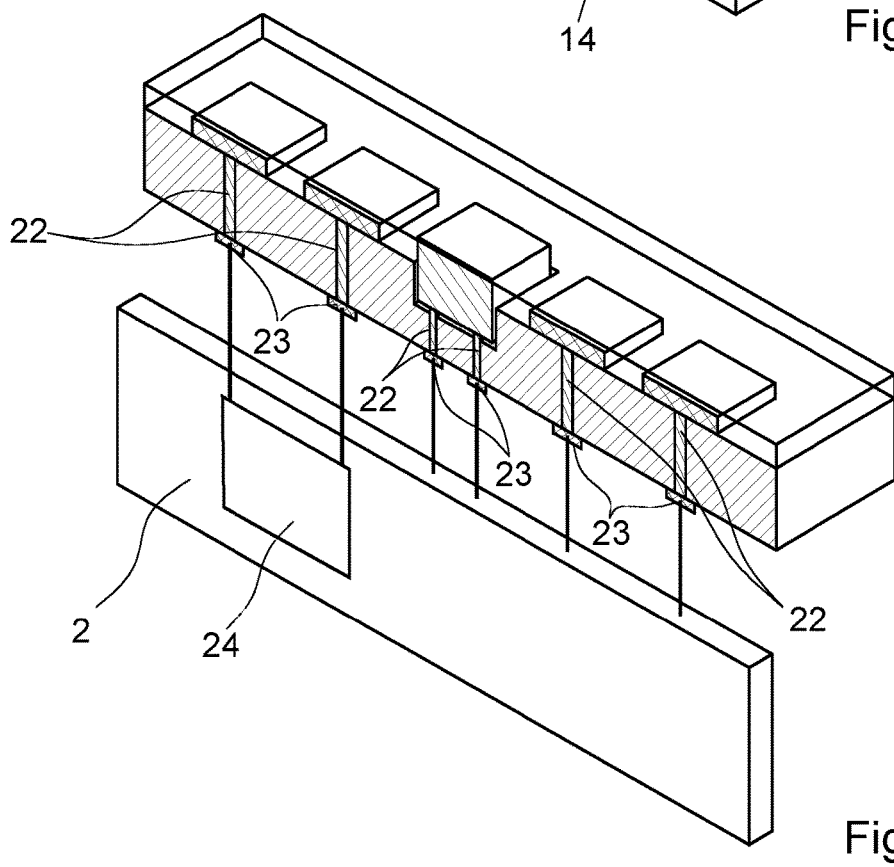

FIG. 2a shows, in an abstracted perspective representation, essential features of the flow sensor 4. FIG. 2b is a sectional view of FIG. 2a, from which the electrical connections of the sensors 13, 14 and 15 with the sensor control 2 are also shown. The section is taken along a plane in which the sensor axis 12 is located. The flow sensor 4 is a first embodiment. As already described, the flow sensor 4 has the sensor carrier 10 with the sensor array 11. The sensor array 11 has the sensor axis 12, the first permittivity sensor 13, the second permittivity sensor 14 and the density sensor 15. The sensors 13, 14 and 15 are arranged on the sensor axis 12. The two permittivity sensors 13 and 14 are spaced apart with the permittivity sensor distance d, and the density sensor 15 is located between them.

The sensor carrier 10 is a printed circuit board. A circuit board, like the present one, consists of an electrically insulating plate-shaped carrier which is provided with a copper layer on each side. The material of the carrier is FR-4 in the present case. Traces are produced, for example, by selectively etching away the copper layers. Electrical connections between the two sides of the carrier are produced by vias.

The first permittivity sensor 13 and the second permittivity sensor 14 are designed identically, which is why only the first permittivity sensor 13 is considered below. The first permittivity sensor 13 is formed as a capacitance sensor having a first electrode 18 and a second electrode 19 for determining a capacitance of the medium 5. Each of the electrodes 18 and 19 is a trace of the circuit board. Since the capacitance of the medium 5 is determined at the electrodes 18 and 19, the electrodes 18 and 19 taken together are the sensitive area of the permittivity sensor 13. The width b and the length/of each of the electrodes 18 and 19 is b=1=0.5 mm. The distance a between the first electrode 18 and the second electrode 19 is a=0.2 mm. Thus, the sensitive region of the first permittivity sensor is smaller than smallest flow structures of the medium 5.

The sensor carrier 10 has a recess 20, in which the density sensor 15 is arranged. In this embodiment, the density sensor 15 is designed as a piezo sensor. Since a density of the medium 5 is determined on the side of the density sensor 15 that is completely in contact with the medium 5, this side is the sensitive region of the density sensor 15. The width b and the length/of this side are also b=1=0.5 mm. Thus, the sensitive area of the density sensor 15 is smaller than smallest flow structures of the medium 5.

By arranging the density sensor 15 in the recess 20 and forming the permittivity sensors 13 and 14 as traces, the surface of the flow sensor 4 is approximately flat. Since the traces of the permittivity sensors 13 and 14 could be damaged in direct contact with the medium 5, the traces are passivated. The passivation is carried out by a passivation layer 21 of amorphous carbon. FIG. 2b shows that the thickness of the passivation 21 is dimensioned such that the density sensor 15 is in direct contact with the medium 5 and the surface of the sensor array 11 is flat.

Furthermore, the electrical connection of the sensors 13, 14 and 15 with the sensor control 2 can also be seen in the sectional representation of the flow sensor 4. The electrical connection is effected by means of vias 22 and traces 23. In this case, the sensors 13, 14 and 15 are directly contacted by the vias 22, whereby no further traces are provided on the side of the sensor carrier 10 on which the electrodes 18 and 19 are arranged, which could impair determination of capacitance of the medium 5. The last section of the electrical connection is not represented by the traces 23, but by lines in abstracted form.

The sensor control 2 is designed for controlling the sensors 13, 14 and 15 of both flow sensors 4. This includes, in particular, determining permittivities of the medium 5 with each of the four permittivity sensors 13 and 14 and determining densities of the medium 5 with each of the two density sensors 15.

Since the sensor control 2 is designed identically with respect to the four permittivity sensors 13 and 14, the configuration of the sensor control with respect to the first permittivity sensor 13 is described below.

To determine a first permittivity of the medium 5 with the first permittivity sensor 13, the sensor control 2 has an electrical LC resonant circuit 24 with a resonance frequency. The first permittivity sensor 13 is a part of the resonant circuit 24. Since the electrodes 18 and 19 together with the medium 5 form a capacitor with a capacitance in which the medium 5 is a dielectric, the permittivity sensor 13 contributes to the capacitive component of the resonant circuit 24. The sensor control 2 determines the first permittivity of the medium 5 from the resonance frequency, taking into account that the resonance frequency depends on the capacitance and the capacitance on the permittivity of the medium 5.

In order to determine a second permittivity of the medium 5 with the second permittivity sensor 14, the sensor control 2 is configured accordingly.

Figure 3:
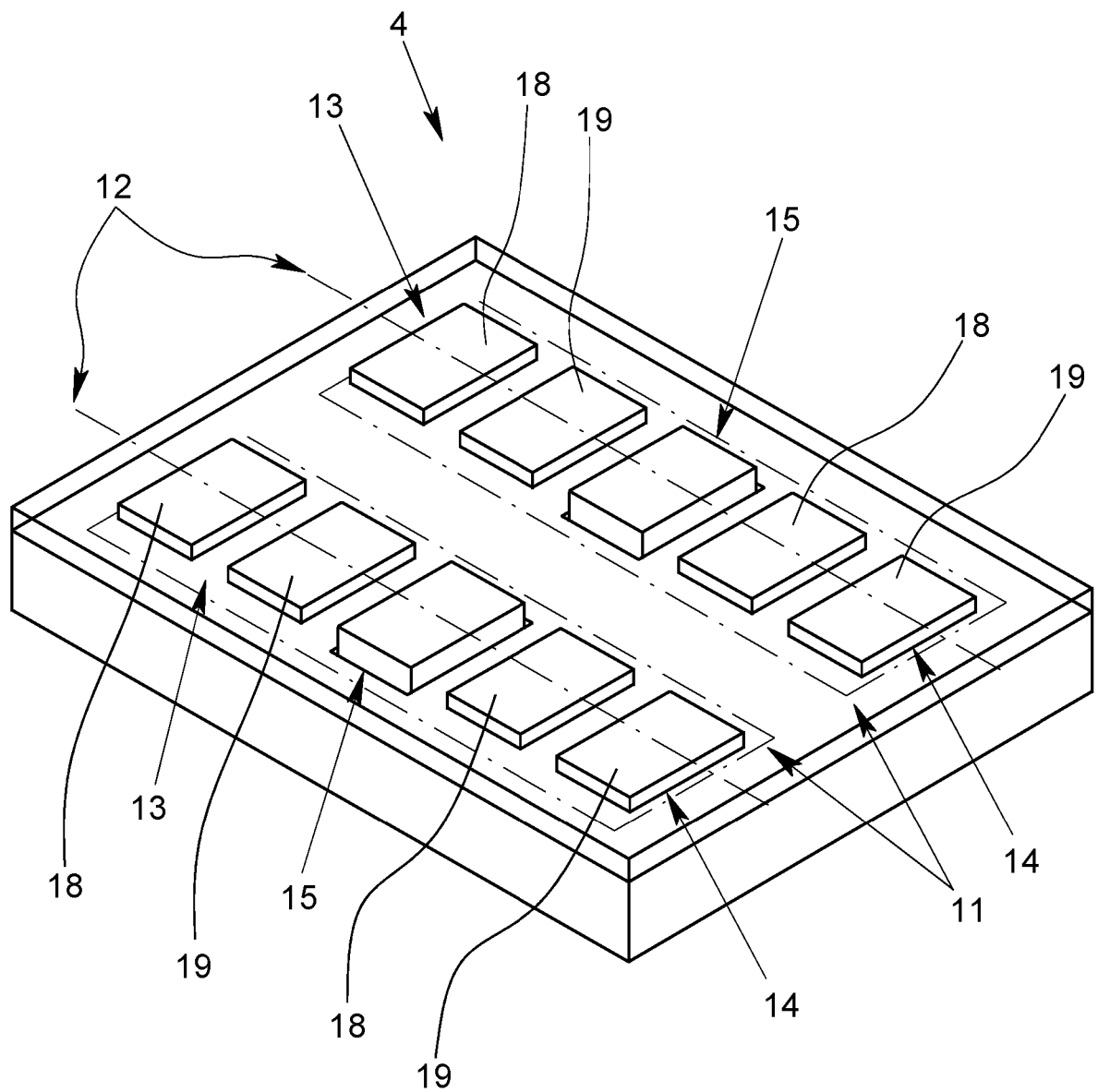
FIG. 3 illustrates a second embodiment of a flow sensor.

FIG. 3 shows essential features of a second embodiment of a flow sensor 4 in an abstracted perspective view. The flow sensor 4 has a sensor carrier 10 with two sensor arrays 11. Each of the two sensor arrays 11 is identical to the sensor array of the first embodiment of a flow sensor 4. In the second embodiment illustrated in FIG. 3, the sensor axes 12 are aligned parallel to one another. The small size of the sensitive areas of the sensors 13, 14 and 15 with respect to the flow structures of the medium 5 makes possible the small distance of the sensor arrays 11 shown in FIG. 3. In conjunction with the parallel alignment of the sensor axes 12, determinations of permittivities and densities by the sensor arrays 11 have redundancies, which improves a measuring accuracy. In a third embodiment of the flow sensor 4, the sensor axes 12 of the sensor arrays 11 are not aligned parallel but perpendicular to one another, i.e. different, whereby the sensor axes 12 span a plane and the sensor arrays 11 are sensitive to flow speeds in directions different from one another.

Figure 4:
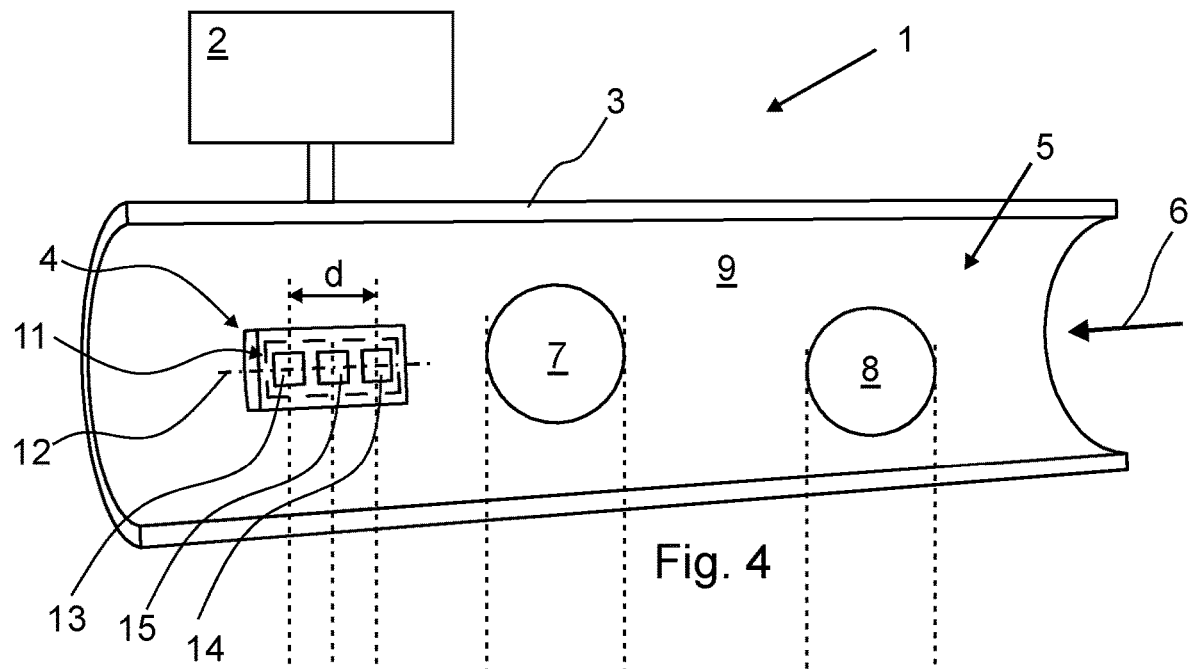
FIG. 4 illustrates a second embodiment of a flowmeter having one flow sensor.

FIG. 4 shows a second embodiment of a flowmeter 1. In contrast to the first embodiment, the second embodiment has only one flow sensor 4, and the sensor control 2 is designed correspondingly to the control of only one flow sensor. The rest of the second embodiment is identical to the first embodiment.

Figure 6:
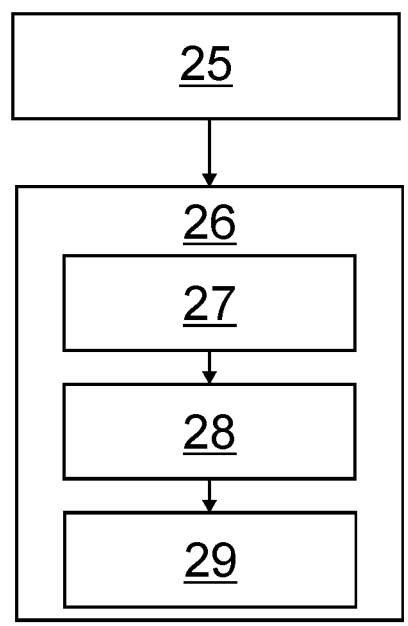
FIG. 6 illustrates a flow chart of a method.

The sensor control 2 is designed to carry out a method with the method steps shown in FIG. 6 during operation of the flowmeter 1.

Figure 5A:
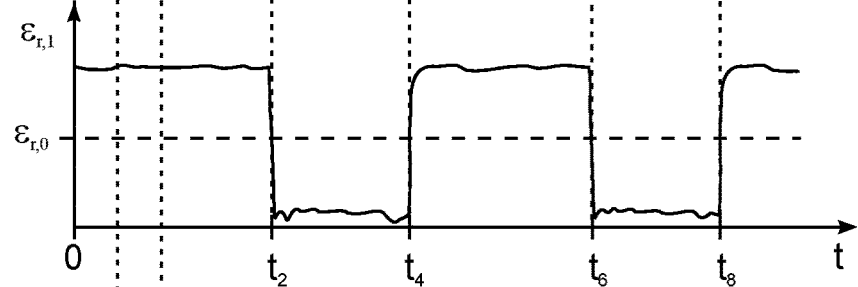
FIGS. 5a-5c plot measuring signals of the flow sensor.
Figure 5B:
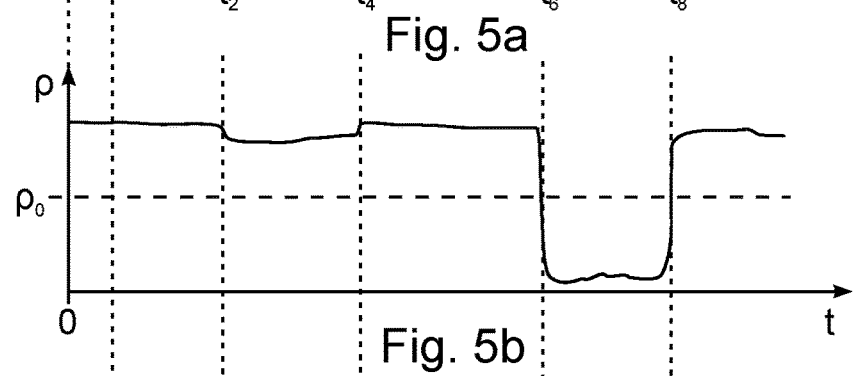
Figure 5C:

In a first method step 25, a first permittivity curve $\varepsilon_{r,1}$ is determined with the first permittivity sensor 13, a second permittivity curve $\varepsilon_{r,2}$ is determined with the second permittivity sensor 14, and a density curve $\rho$ of the medium 5 is determined with the density sensor 15. The first permittivity curve is shown in FIG. 5a, the density curve in FIG. 5b and the second permittivity curve in FIG. 5c.

In a second method step 26, speeds of phases of the multi-phase medium 5 are determined using a correlation method on the first permittivity curve $\varepsilon_{r,1}$, the second permittivity curve $\varepsilon_{r,2}$ and the density curve $\rho$.

The correlation method includes specifying a permittivity limit value $\varepsilon_{r,0}$ and a density limit value $\rho_0$. Considering that the permittivity of water is $\varepsilon_{r,water}=80$, of oil is $\varepsilon_{r,oil}=2.5$ and of gas is $\varepsilon_{r,gas}=1$, and that the density of water is $\rho_{water}=1000$ kg/m³, of oil is $\rho_{oil}=800$ kg/m³, and of gas $\rho=1$ kg/m³, the permittivity limit value is specified as $\varepsilon_{r,0}=40$ and the density limit value is specified as $\rho_0=500$ kg/m³. The phase water is assumed above the permittivity limit value $\varepsilon_{r,0}$, and the phase of oil or gas are below it. The phase water or oil is assumed above the density limit $\rho_0$, and the phase gas is assumed below it.

The second method step 26 has a plurality of sub-method steps.

In a first sub-method step 27, decreases in permittivity from above to below the permittivity limit value $\varepsilon_{r,0}$ are detected in the first permittivity curve $\varepsilon_{r,1}$, namely a first decrease in permittivity at time $t_2$, and a second decrease in permittivity at time $t_6$. These decreases in permittivity are also detected in the second permittivity curve $\varepsilon_{r,2}$ at the times $t_1$, and $t_5$.

In a second sub-method step 28, permittivity change intervals $\Delta t_1=(t_2-t_1)$ and $\Delta t_2=(t_6-t_5)$ are determined between the decreases in permittivity in the first permittivity curve $\varepsilon_{r,1}$ and in the second permittivity curve $\varepsilon_{r,2}$, and using the permittivity change intervals $\Delta t_1$ and $\Delta t_2$ and the permittivity sensor distance d, speeds $v_1=d/\Delta t_1$ and $v_2=d/\Delta t_2$ of the decreases in permittivity are determined.

In a third sub-method step 29, speeds of the decreases in permittivity $v_1$ and $v_2$ are assigned to speeds of phases of the multi-phase medium 5 using the density curve $\rho$ and the first permittivity curve $\varepsilon_{r,1}$ and the second permittivity curve $\varepsilon_{r,2}$.

Since, during the first decrease in permittivity, the density curve $\rho$ remains above the density limit value $\rho_0$, it is oil and the speed $v_1=d/\Delta t_1$ is assigned to the oil bubble 9. Since, in the case of the second decrease in permittivity, the density curve $\rho$ runs from above to below the density limit value $\rho_0$, this is gas and the velocity $v_2=d/\Delta t_2$ is assigned to the gas bubble 10.

Thus, the flowmeters 1 are designed according to both embodiments for determining speeds of phases of a multi-phase medium.

The invention claimed is:

1. A method for determining speeds of phases of a multi-phase medium, comprising:
   immersing a flow sensor into a flowing multi-phase medium, the flow sensor including:
      a sensor carrier having at least one first sensor array;
      the at least one first sensor array has a first permittivity sensor for determining a first permittivity of a multi-phase medium, a second permittivity sensor for determining a second permittivity of the medium, a density sensor for determining a density of the medium, and a first sensor axis;
      the first permittivity sensor, the second permittivity sensor, and the density sensor are arranged on the sensor carrier along the first sensor axis; and
      the first permittivity sensor and the second permittivity sensor are spaced apart with a permittivity sensor distance;
   determining a first permittivity curve with the first permittivity sensor, determining a second permittivity curve with the second permittivity sensor, and determining a density curve of the medium with the density sensor; and
   determining at least one speed of a phase of the medium from the first permittivity curve, the second permittivity curve, and the density curve using a correlation method.

2. The method according to claim 1, wherein the correlation method includes the following steps:
   detecting a permittivity change in the first permittivity curve, the permittivity change being detected in the second permittivity curve;
   determining a permittivity change interval between the permittivity change in the first permittivity curve and in the second permittivity curve, determining a speed of permittivity change using the permittivity change interval and the permittivity sensor distance; and assigning the speed of the permittivity change to a speed of a phase of the medium using the density curve and/or the first permittivity curve and/or the second permittivity curve.

3. A flowmeter for determining speeds of phases of a multi-phase medium in a measuring tube, the flowmeter comprising:

a sensor control;

a measuring tube; and at least one first flow sensor;

the at least one first flow sensor including:

a sensor carrier having at least one first sensor array;

the at least one first sensor array has a first permittivity sensor for determining a first permittivity of a multi-phase medium, a second permittivity sensor for determining a second permittivity of the medium, a density sensor for determining a density of the medium, and a first sensor axis;

the first permittivity sensor, the second permittivity sensor, and the density sensor are arranged on the sensor carrier along the first sensor axis; and the first permittivity sensor and the second permittivity sensor are spaced apart with a permittivity sensor distance;

the sensor control is designed for carrying out a method including the following steps:

immersing the at least one first flow sensor into a flowing multi-phase medium determining a first permittivity curve with the first permittivity sensor, determining a second permittivity curve with the second permittivity sensor, and determining a density curve of the medium with the density sensor; and determining at least one speed of a phase of the medium from the first permittivity curve, the second permittivity curve, and the density curve using a correlation method; and the at least one first flow sensor is arranged at a first measuring position on the measuring tube so that when a multi-phase medium flows through the measuring tube, the medium flows around the flow sensor, the flow sensor has a first immersion depth in the medium, and the first sensor axis has a component parallel to a direction of flow of the medium.

4. A flowmeter according to claim 3, wherein the measuring tube is designed so that the at least first flow sensor can be inserted and removed during operation.

5. A flowmeter according to claim 3, wherein the sensor control has at least one resonant circuit having a resonance frequency, the first permittivity sensor is a part of the resonant circuit, and the first permittivity of the medium is determined using the resonance frequency.

6. A flowmeter according to claim 3, wherein the flowmeter has a second flow sensor at a second measuring position having a second immersion depth, and the second measuring position differs from the first measuring position and/or the second immersion depth differs from the first immersion depth.

* * * * *